(12) United States Patent
Wolf

(10) Patent No.: US 7,734,357 B2
(45) Date of Patent: Jun. 8, 2010

(54) SYSTEM FOR OPERATING AN INSTALLATION BY EDITING GRAPHIC OBJECTS

(75) Inventor: Gunnar Wolf, Nürnberg (DE)

(73) Assignee: Siemens AG, Munich (DE)

( * ) Notice: Subject to any disclaimer, the term of this patent is extended or adjusted under 35 U.S.C. 154(b) by 641 days.

(21) Appl. No.: 11/628,514

(22) PCT Filed: May 13, 2005

(86) PCT No.: PCT/DE2005/000918

§ 371 (c)(1), (2), (4) Date: Dec. 4, 2006

(87) PCT Pub. No.: WO2005/119381

PCT Pub. Date: Dec. 15, 2005

(65) Prior Publication Data

US 2007/0244582 A1 Oct. 18, 2007

(30) Foreign Application Priority Data

Jun. 4, 2004 (DE) ........................ 10 2004 028 177

(51) Int. Cl.
*G06F 19/00* (2006.01)
(52) U.S. Cl. ..................... 700/17; 707/100; 715/853
(58) Field of Classification Search ................. 700/17, 700/83, 79, 65, 169, 18, 87, 95–96; 715/516, 715/530, 812, 853; 709/221, 223, 220; 345/160; 705/7; 707/6–10, 100, 103–104, 37
See application file for complete search history.

(56) References Cited

U.S. PATENT DOCUMENTS

| | | | | |
|---|---|---|---|---|
| 5,224,209 A | * | 6/1993 | Hirai et al. ................. | 715/840 |
| 5,470,218 A | * | 11/1995 | Hillman et al. ............. | 425/144 |
| 5,611,059 A | * | 3/1997 | Benton et al. ............... | 715/734 |
| 5,818,455 A | * | 10/1998 | Stone et al. ................. | 345/619 |
| 5,832,503 A | * | 11/1998 | Malik et al. ................ | 709/223 |

(Continued)

FOREIGN PATENT DOCUMENTS

DE 44 47 218 A1 1/1996

(Continued)

OTHER PUBLICATIONS

German Office Action dated Feb. 4, 2009.

(Continued)

*Primary Examiner*—Kidest Bahta
(74) *Attorney, Agent, or Firm*—Laurence A. Greenberg; Werner H. Stemer; Ralph E. Locher

(57) ABSTRACT

A system is used to operate partial units of a technical installation by editing graphic objects, the system contains a graphic editor and a data editor. During the selection of a graphic object by the graphic editor, the data editor, which produces or modifies the control and configuration data and signals for a technical installation which is to be controlled, is called. The selection of the user is examined, in relation to the plausibility and consistency thereof, for the predetermined operational state of the technical installation. Subsequently, the modified and current configuration data is visualized in the graphic editor and the graphic object is modified based on the graphic object selected by the user.

21 Claims, 2 Drawing Sheets

U.S. PATENT DOCUMENTS

| | | | |
|---|---|---|---|
| 5,854,749 | A * | 12/1998 | Kellams et al. .............. 700/146 |
| 5,905,649 | A | 5/1999 | Sojoodi et al. |
| 5,950,006 | A * | 9/1999 | Crater et al. ................. 717/140 |
| 5,999,192 | A * | 12/1999 | Selfridge et al. ............ 345/440 |
| 6,370,569 | B1 | 4/2002 | Austin |
| 6,377,283 | B1 * | 4/2002 | Thomas ...................... 715/762 |
| 6,442,512 | B1 * | 8/2002 | Sengupta et al. ............... 703/6 |
| 6,643,555 | B1 * | 11/2003 | Eller et al. ..................... 700/83 |
| 6,784,902 | B1 | 8/2004 | Melder et al. |
| 6,854,111 | B1 * | 2/2005 | Havner et al. ............... 717/163 |
| 2002/0016725 | A1 * | 2/2002 | Eichstaedt et al. ............. 705/7 |
| 2003/0035009 | A1 | 2/2003 | Kodosky et al. |

FOREIGN PATENT DOCUMENTS

| | | |
|---|---|---|
| DE | 199 42 315 A1 | 5/2001 |
| EP | 0 597 316 A2 | 5/1994 |

OTHER PUBLICATIONS

"Aspect Object™ technology from ABB"—Solution to the corporate information management problem, [http://www.02.abb.com/GLOBAL/seitp161.nsf/viewunid/06D6895533D9A34FC1256BA6003D6568/$file/Aspects+Objects+23_4+170_dpi.pdf] [rech.20.09.2006], 2001.

Zaijun Hu et al.: "Intelligent Binding in the Engineering of Automation Systems Using Ontology and Web Services", IEEE Transactions of Systems, Man and Cybernetics, C, Bd. 33, pp. 403-412, Aug. 2003.

* cited by examiner

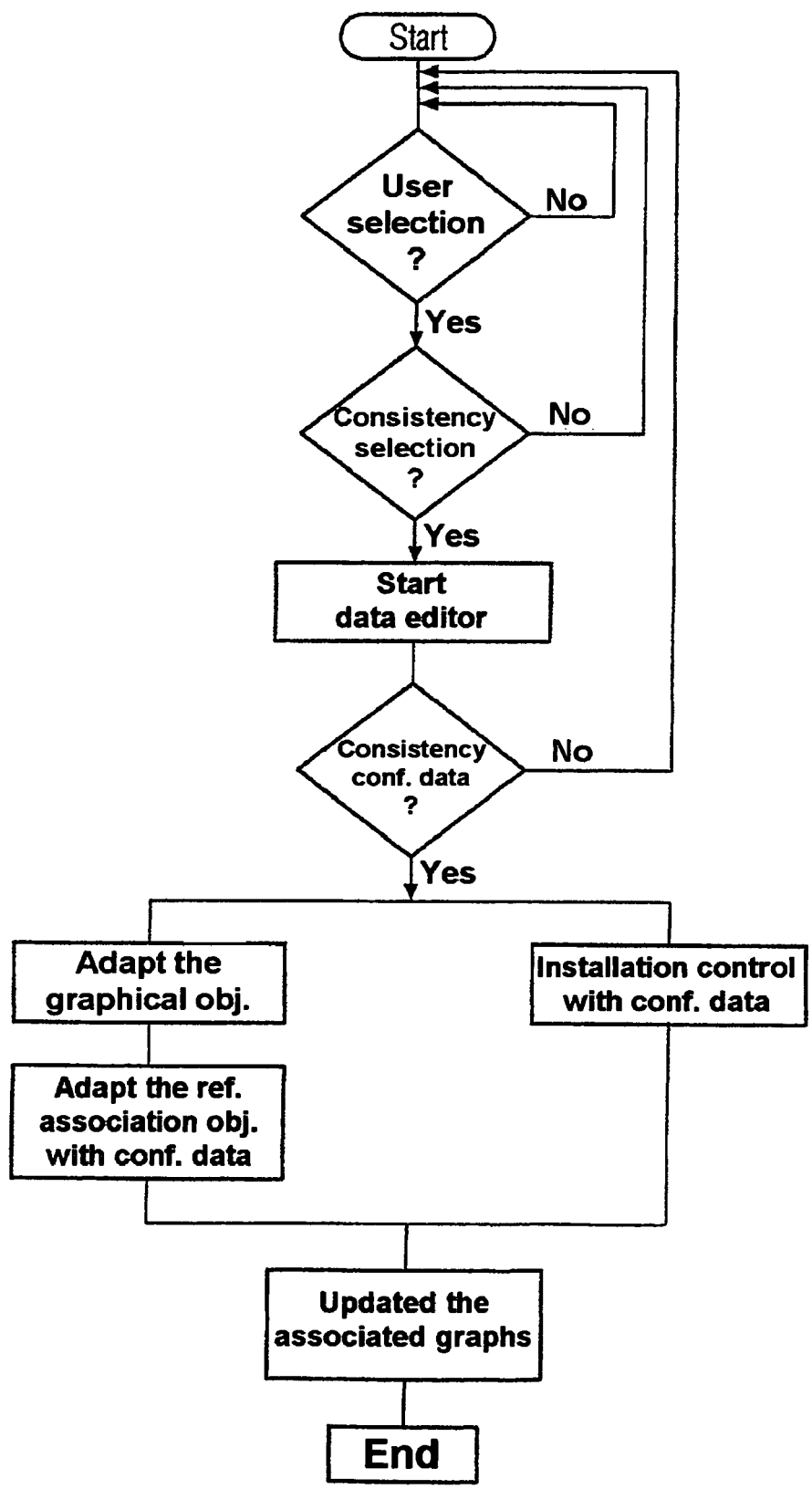

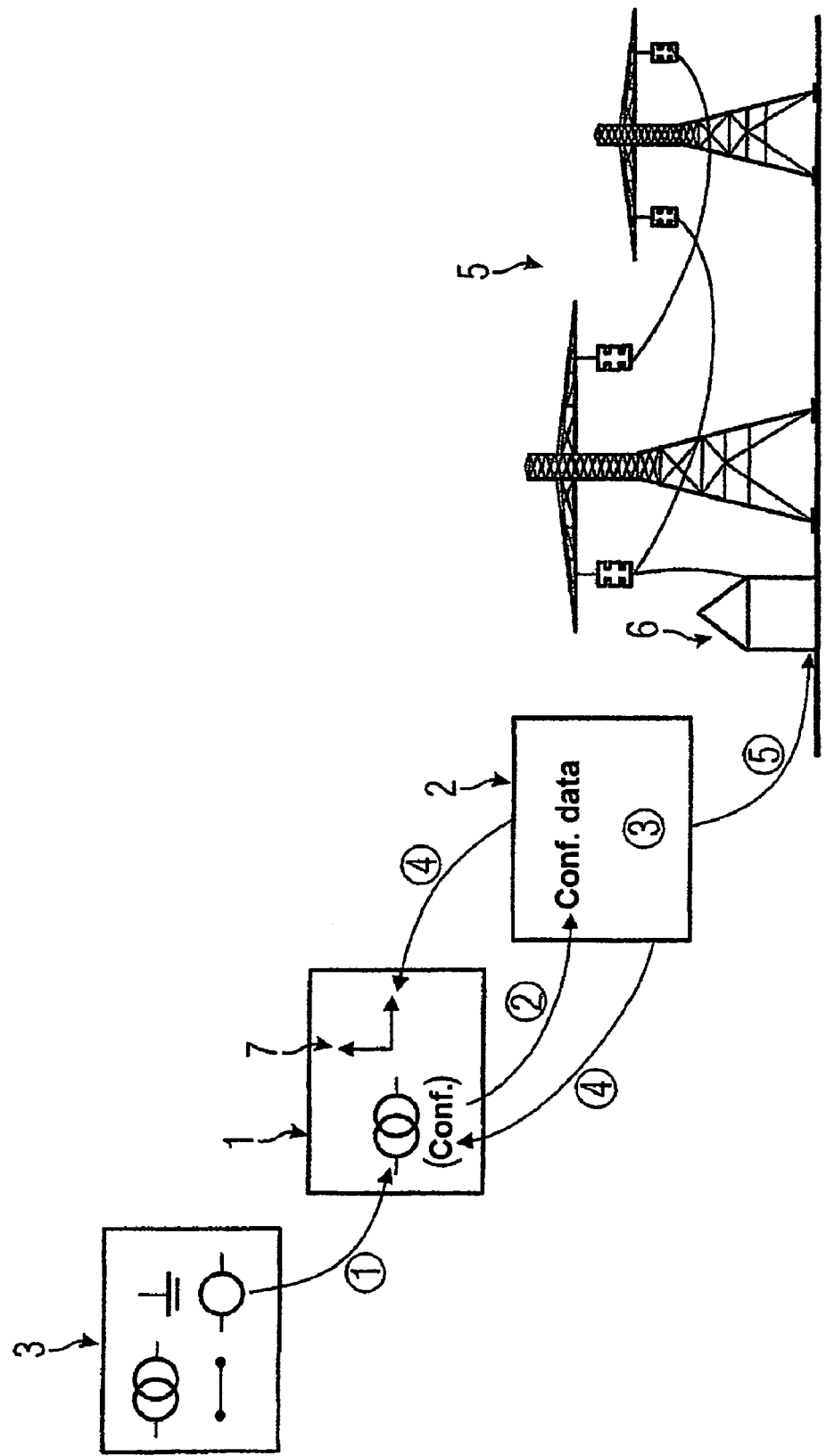

SYSTEM FOR OPERATING AN INSTALLATION BY EDITING GRAPHIC OBJECTS

BACKGROUND OF THE INVENTION

Field of the Invention

The invention relates to a system for the operator control of subunits in a technical installation by editing graphical objects, comprising a graphics editor, a symbol database from which it is possible to take graphical objects using the graphics editor and in which the graphical objects graphically represent respective subunits in a technical installation, and a process data element in which the measured process data from the technical installation are updated and are combined to form graphs for the respective subunits. These graphs depict, in particular, the space-time profile for the process data within the technical installation of the respective subunits.

The monitoring of technical installations using computer-based visual display systems is widespread and general prior art. In this case, the monitoring and control appliances used within the technical installation produce a wealth of process data which to some extent can now be monitored by and displayed to humans only using visual systems. The technical installation's process data collected in this fashion are visually displayed on a graphical interface for system observation on appropriate platforms, such as HMI or SCADA systems, and are combined to form graphs.

Not to be confused with this are alterations to subunits or the entire technical installation by configuration, switching and control operations which alter the system setup of the technical installation or which control operating states, such as the addition of a further subunit to an existing technical installation. To this end, the control and configuration signals through automatic or through inputs by a user using an input mask are produced directly and transmitted to the relevant subunit. This alters the operating states and/or the setup of the technical installation. These "technical" control and monitoring data and signals are used for direct control of the technical installation or of the actuated subunits and must be distinguished from the process data visually displayed in the form of "graphical" diagrams.

Previous control systems are set up such that alterations to the configuration or to the operating state of the technical installation can be made directly only on the input mask of the "technical" level, and in this case the configuration data are produced or updated for each subunit. The configuration data are provided in this way for all subunits in the installation. After this depiction of the technical installation in the form of all configuration data, the process data connected to this changed technical installation for the respective measurement and monitoring points are then read, evaluated and combined to form graphs. On the basis of this technical installation configuration established at a particular instant, the configuration data are thus used to produce the process-data-dependent graphs. The graphs produced in this manner are then visually displayed on graphical interfaces and can be selected and viewed by a user using a graphics editor. Alteration of the technical installation or of subunits by a change in the configuration data using the graphics editor is not possible, since altering a particular subunit has a direct influence on the entire configuration or the operating state of the technical installation and therefore necessitates an update for all configuration data. These updated configuration data are subsequently again used as a basis for currently measured process data and hence for adapting the visually displayed graphs. The hierarchical data model design—on the basis of the technical level with a superordinate graphical level—of the visually displayed graphs prevents or encumbers selective alteration of the installation configuration and its graphical display by means of a graphics editor. It is therefore only ever possible to alter the installation configuration on the technical level, whose effects on the process data and graphs can only ever be visually displayed graphically afterwards.

In conventional systems, an alteration to the technical installation is additionally preceded by the performance of a model calculation for all configuration data on the basic assumption of the desired installation change. However, this model calculation is not yet used to control the technical installation, but rather simulates the plausibility and consistency of the desired change within the altered technical installation in advance. If there is a plausible and consistent model solution for the altered technical installation, this model solution is taken as a basis for updating all configuration and process data and altering the installation configuration. Thus, DE 44 47 218 A1, for example, describes a process diagnosis model computer for advance simulation of a changed technical installation. These systems do not allow a selective alteration of technical subunits and exclusive updating of the associated graphs on account of the hierarchical data model design described above.

SUMMARY OF THE INVENTION

It is therefore an object of the present invention to provide an operator control and monitoring system which does not have the aforementioned drawbacks and which allows rapid and simple operator control of a technical installation by the user.

The object is achieved by the invention described in claim 1. In this context, the invention provides for the operator control of the graphics editor by a user to be monitored and analyzed by the system, with the selection of a graphical object on the graphical interface by the user prompting a data editor to be started.

The data editor within the context of the present invention is a system for producing, storing, altering or erasing configuration data using the interfaces between the subunits in the technical installation, the configuration data being used as control, switching and monitoring signals and being able to be archived in a database. A subunit within the context of the invention is understood to mean any component in an installation which performs a function within the installation and can be actuated or configured by switching and control signals. In a high-voltage network as the technical installation, subunits may be transformers or circuit breakers, for example, which are either added to the network or decoupled, or their operating states are altered.

Configuration data within the context of the invention are all data and signals which are used for controlling, monitoring and configuring a technical installation or a selected subunit and which can be combined in the form of files. The configuration data are firstly used for configuring a subunit in a technical installation, configuration within the context of the invention also covering the addition or disconnection of the subunit with respect to the technical installation.

Next, the data editor produces or updates the configuration data for the represented subunit which are associated with the selected graphical object and performs the necessary user interrogations and then evaluates them. For particular subunits, configuring the installation may require certain user interrogations, which are included in the relevant configuration data's update associated with the subunit. The graphics editor then logically combines the graphical object with the updated association for the updated configuration data, with the data editor also performing and evaluating a necessary user interrogation and adding the results of the user interrogation to the configuration data as updates, and the data editor using the updated configuration data to switch, control or reconfigure the technical installation or the respective subunits. Advantageously, the graphical object is updated in the graphics editor and the configuration data are updated in the data editor at the same time, which means that the graphical object on the graphical level is a depiction updated subunit on the technical level. In addition, configuration data control system and operating states, such as switching states of switchgear in an electrical supply network, in the technical installation or in the subunits. In the subunits, the configuration data are converted either directly for control or into subunit specific control signals.

The inventive system provides logic combinations between the graphical objects and the subunits representing them, with alterations on the graphical or technical level influencing one another and therefore allowing graphical control of the technical installation using graphics editors. In comparison with the prior art, it is therefore possible to alter the operating parameters of a subunit represented as a graphical object by selecting the graphical object, the alteration of the technical installation in turn having reactions on the visual display of the graphical object or on the associated process data. By calling a data editor when selecting a graphical object using a graphics editor, a connection is set up from the graphical interface to the technical level. The data editor is used to initiate or alter the configuration data for implementing and controlling the subunits in the technical installation. The production of new configuration data is necessary particularly when a freshly selected subunit is added to the existing technical installation for the first time. These altered configuration data are then used firstly to control and alter the installation configuration. At the same time, these altered configuration data are logically combined with the associated graphical object in the graphics editor and likewise the associated graphs are recalculated and updated on the basis of the altered installation configuration.

Advantageously, the graphics editor, when editing a graphical object, compares the consistency of the technical installation on the basis of the selected graphical object with an association function, particularly an association table, and allows the data editor to be called only if the association is admissible. In this context, a check is also performed to determine whether the respective graphical object actually has an associated configuration data and whether the graphical object is contained in the symbol database. If appropriate configuration data are not available for a graphical object then they are produced and are associated with the graphical object.

Consistency within the context of the present invention covers checking the compatibility and plausibility of the technical installation change desired by the user or by the system taking into account admissible installation configurations and/or operating limits for the subunits, such as the two subunits cannot be connected to one another on account of technical circumstances.

The association function can therefore be used to check, by way of example, a technically unmakeable connection between two subunits with appropriately associated configuration data for its consistency exclusively on the graphical level. In this context, only the graphical depiction of the technical installation in the graphics editor is examined, the technical configuration data not being used for this consistency check. Should the check actually reveal an inconsistency, shown in the association function, for the selected graphical object then the data editor is not initiated and hence a connection is not set up from the graphical level to the technical level of the system control. This filter function of the graphics editor on using the association function avoids time-consuming and memory-space intensive program calls for applications which are not needed, such as the data editor, within the system. This increases the inventive system's execution reliability, since a multiplicity of process applications which are not required are not called as a result.

In one preferred embodiment, the data editor takes the graphical user selection in the graphics editor as a basis for updating the configuration data for the graphically represented subunits, the updated configuration data not yet being transmitted for control to the technical installation or to the subunit.

Advantageously, the data editor likewise checks the consistency of the updated configuration data and/or the results of the user interrogation for the selected subunit within the technical installation, and buffer-stores the subunit's updated configuration data formed in the data editor in a file only if consistency exists.

The consistency check in the graphics editor using the association function, and the subsequent consistency check on the updated configuration data and/or on the results of the user interrogation in the data editor, subjects the graphical operator control of the technical installation by a user to a two-stage consistency check, which greatly minimizes the operator control's susceptibility to error and ensures a high level of reliability for operation of the technical installation.

The check of consistency in the data editor is performed taking into account the results of additional modeling of the changed technical installation on the basis of the changed configuration data by a topology processor. As a basis for the modeling, either the entire changed installation configuration is calculated or just the selected subunit is modeled with appropriate interface simulations for the rest of the technical installation.

Preferably, the data editor checks the consistency of the updated configuration data possibly with the necessary results of the user interrogation with the admissible configurations of the technical installation in respect of the selected subunit, and stores the updated configuration data formed in the data editor in a buffer store only if consistency exists.

An even more preferred embodiment is that the data editor compares the consistency of the updated process data and/or the user stipulations for the selected subunit with the admissible operating states of the technical installation, and buffer-stores the updated configuration data formed in the data editor only if consistency exists. User stipulations are parameters which the user can freely select for prescribed operating states, such as prescribed temperature or current load states within the technical installation. In contrast, user interrogations are absolutely necessary interrogations for the operation of a subunit. This check on the process data extends the consistency check in the data editor not just to the installation configuration but also to the operating states depicted by the process data or graphs within the installation.

The authorized buffer-storage of the updated configuration data formed in the data editor is used particularly to maintain the existing configuration data until there is a consistent update for the selected configuration data. Only from this instant onward is it possible to alter the technical installation. Should an error or premature termination of the buffer-storage operation occur, the previously present system configuration is maintained and ensures reliable further operation of the technical installation without any partial and hence incomplete change being made.

In line with another embodiment, the consistency of the graphical objects selected by the user with the existing technical installation is checked using the association function and/or the updated configuration data and/or the results of the user interrogation within the technical installation, and/or the updated process data elements with admissible operating states within the technical installation, using intelligent expert systems, particularly neural networks. This means that it is possible to define even complex configuration and operating states and hence also to monitor them for their consistency and plausibility for operation of the technical installation.

Preferably, the data editor uses the buffer-stored, updated configuration data to produce an update data record with a graphics data format, particularly XML format. A general graphics data format for the update data record ensures rapid and simple data input into the graphics editor in comparison with transferring the substantially more extensive configuration data. This likewise allows simple association within the graphics editor between the update data record buffer-stored in a graphics data format and the associated graphical object.

Preferably, a document database imports and archives the update data records buffer-stored in a graphics data format. At the same time, the data editor provides the associated, updated configuration data for the further control or monitoring of the technical installation. Advantageously, only the associated update data records for the graphical objects selected by the user are imported into the graphics editor, and hence the data transfer to the graphics editor following a change is reduced.

In another preferred embodiment, the configuration data and/or the update data record are stored in the form of shared memory mapped files and can be used jointly with other system components.

In this case, shared memory mapped files are understood to mean a data store structure as described by way of example in "Solaris Internals" (Jim Mauro, Richard McDougall Prentice Hall PTR, 2000). This data model can be used by a plurality of applications at the same time.

Preferably, the data editor analyzes the updated configuration data for the selected subunit and makes technically required additions. Thus, for the purpose of selecting just one node on a two-node connecting line, the system connects the second node to the existing technical installation. The configuration data extended in this manner are then buffer-stored and are used to produce the update data record. This update data record is imported into the graphics editor, which in turn takes the extended update data record as a basis for making additions to the associated graphical object and hence alters said object. In addition, only the process data elements for the subunit associated with the selected graphical object are updated and hence extensive data transfer of unnecessary data is avoided.

Preferably, a technical installation is a supply line network, particularly a high-voltage, gas or water network.

The invention likewise provides a symbol database for taking graphical objects, the graphical objects graphically representing respective subunits in a technical installation, in a system for the operator control of subunits in a technical installation by editing graphical objects. The invention also relates to a document database for storing files in a technical installation and its subunits, such as the configuration data, the process data elements and the update data records, the data being updated and for controlling the technical installation, for visually displaying the graphical objects representing the technical installation, and also for showing the process data combined to form graphs for the respective subunits, in a system for the operator control of subunits in a technical installation by editing graphical objects.

The invention likewise provides a method for the operator control of subunits in a technical installation by editing graphical objects, with a graphics editor, a data editor for altering and updating configuration data from the subunits in the technical installation, with a symbol database from which it is possible to take graphical objects using the graphics editor, a process data element in which all measured process data from the technical installation are updated and are combined to form graphs for the respective subunits. The symbol database may optionally also be integrated directly in the graphics editor. In this case, the operator control of the graphics editor by a user is monitored and analyzed, with a data editor being started when the user selects a graphical object. The data editor produces or updates the configuration data for the represented subunit which are associated with the selected graphical object, and/or—to the extent required—user interrogations are performed, evaluated and added to the configuration data as an update. The graphics editor then logically combines the graphical object with the updated association between the updated configuration data and the results of the user interrogation, with the data editor using the updated configuration data to switch, control or reconfigure the technical installation or the respective subunits.

In addition, the invention provides a method which checks the consistency of the selected objects in respect of already available objects using an association function, particularly an association table, and then, upon an admissible object selection in line with the association function, updates the configuration data associated with the represented subunit and checks the consistency of the then updated configuration data for the selected subunit using admissible configurations of the technical installation, and/or, upon an admissible selection in line with the association function, updates the process data elements associated with the represented subunit and checks the consistency of the then updated process data elements for the selected subunit using admissible operating states of the technical installation, and then allows the object selection, the updated configuration data and/or the updated process elements to be processed further only if the object selection, the updated configuration data and/or the updated process elements are consistent. Represented objects in the context of the invention may be all objects which can be registered by humans, in particular visual, audio or tactual objects.

The invention also provides a computer program product for the operator control of subunits in a technical installation by editing graphical objects, where the computer program product contains the following components: a graphics editor, where the latter's operator control by a user is monitored and analyzed by the graphics editor, and a data editor is started when the user selects a graphical object; a data editor which produces or updates the configuration data for the represented subunit which are associated with the selected graphical object, and/or FIG. 2 shows a schematic illustration of the inventive system.

BRIEF DESCRIPTION OF DRAWINGS

FIG. 1 is a flowchart showing a method according to the invention; and

FIG. 2 is a schematic illustration of an inventive system using the example of an electrical circuit network as a technical installation.

DESCRIPTION OF THE PREFERRED EMBODIMENTS

FIG. 1 shows a flowchart of the inventive method sequence. Following the system start with initiation of the graphics editor 1, the operator control of the graphics editor 1 by the user is continually monitored. If the user selects a graphical object with the graphics editor 1, the consistency of the user selection is checked by the system in a subsequent step. The consistency check is performed using an association function 8, such as an association table, or using expert systems. In this context, the selected graphical object is taken as a basis for checking the plausibility and consistency of the user selection. This check is performed exclusively on the graphical level and is compared with the graphically represented, technical installation 5. If the user selection is consistent, the data editor 2 is started and hence a connection to the technical level is made for the first time. The data editor 2 checks the consistency of the selection made by the user on the technical level on the basis of the available configuration data and the prescribed operating limits for the technical installation 5. The consistency check likewise uses process data and user stipulations. If consistency exists then firstly the graphical object is adapted and secondly the configuration data are produced or updated. In this case, the update is only accepted by the technical installation 5 if the buffer-stored configuration data have been read completely into the associated subunit 6 and into the graphics editor 1. Similarly, the updated graphical object is assigned the updated configuration data in the graphics editor 1 using an update data record. Finally, the altered installation configuration is taken as a basis for recalculating and updating the measured process data.

FIG. 2 shows a schematic illustration of the inventive system using the example of an electrical circuit network as a technical installation 5. The user uses the graphics editor 2 to select a graphical object, e.g. in the form of a transformer symbol, from a symbol database 3 containing a multiplicity of graphical objects and to add them to the work panel of the graphics editor 1, such as a graphical interface. This first step is symbolized by the encircled number 1; this is subsequently referred to as a respective step, in the present case step 1, even for the other steps. This selection by the user is monitored by the system, and the consistency of the selection made is compared with an association function 8 (not shown). If the selection is consistent on the graphical level, the data editor 2 is called in a subsequent program step (step 2) and the graphical changes made in the graphics editor 1 to the technical installation 5 in the form of a high-voltage supply network are checked in terms of their consistency on a technical level (step 3). In this case, the current installation configuration for the high-voltage network, and also current configuration data for the connected switching and transformer stations as subunits 5 and process data elements, such as network load distribution and current network voltage distribution, are included in the check. If the consistency of the user selection is again confirmed, the changed configuration data are buffer-stored. The buffer-stored data are then used firstly to control the technical installation 5 or the subunit 6 in the form of a circuit breaker (step 5) and are secondly used to produce an update data record with a graphics data format. Next, the update data record is imported into the graphics editor 1 (step 4). The graphics editor 1 alters the selected graphical object in line with the changes which the user desires, and produces an updated association between the graphical object and the subunit 6 representing them. At the same time, the buffer-stored configuration data are used to recalculate and update the process data elements visually displayed in the form of graphs 7 (step 4).

REFERENCE SYMBOLS

1. Graphics editor
2. Data editor
3. Symbol database
4. Document database
5. Technical installation
6. Subunit
7. Graph
8. Association function

I claim:

1. A system for operator control of subunits of a technical installation by editing graphical objects, the system comprising:
    a graphics editor for monitoring and analyzing a user operator control command;
    a data editor, being started by said graphics editor, when a user selects a graphical object, said data editor producing and/or updating configuration data for a represented subunit and the configuration data being associated with the graphical object selected, then said graphics editor visually displaying the graphical object with an updated association between the updated configuration data and associated updated graphs, said data editor using the updated configuration data to control or reconfigure the technical installation or the subunits;
    a symbol database connected to and supplying graphical objects to said graphics editor, the graphical objects graphically representing the respective subunits in the technical installation; and
    a process data element updating and combining measured process data from the respective subunits for forming the updated graphs for the respective subunits.

2. The system according to claim 1, wherein said graphics editor, when editing a graphical object, compares a consistency of a graphical user selection made by the user on a basis of the graphical object selected with an association function, and allows said data editor to be called only if the association is admissible.

3. The system according to claim 2, wherein said data editor takes the graphical user selection in said graphics editor as a basis for updating the configuration data for the graphically represented subunits.

4. The system according to claim 1, wherein said data editor compares a consistency of the updated configuration data for the selected subunit with admissible configurations of the technical installation, and buffer-stores the updated configuration data formed in said data editor only if consistency exists.

5. The system according to claim 1, wherein said data editor checks a consistency of updated process data elements for the selected subunit with admissible operating states of the technical installation and/or with user stipulations, and buffer-stores the updated configuration data formed in said data editor only if consistency exists.

6. The system according to claim 2, wherein the consistency of the graphical objects selected by the user with a graphical depiction of the technical installation is checked using the association function, the updated configuration data within the technical installation and/or updated process data elements with admissible operating states within the technical installation using intelligent expert systems.

7. The system according to claim 4, wherein said data editor uses the buffer-stored, updated configuration data to produce an update data record in a graphics data format.

8. The system according to claim 7, wherein said graphics editor imports the update data record buffer-stored in a graphics data format and allocates it to the associated graphical object.

9. The system according to claim 7, wherein the configuration data and/or the update data record are stored in a form of shared memory mapped files and can be used jointly with other system components.

10. The system according to claim 9, wherein said data editor analyzes the updated configuration data for the selected subunit and makes and buffer-stores technically required additions.

11. The system according to claim 10, wherein said graphics editor analyzes the technically required additions documented in the update data record and alters the graphical object accordingly, with only the graphs associated with the selected subunit being updated.

12. The system according to claim 1, wherein the technical installation is a supply line network.

13. The system according to claim 2, wherein said association function is an association table.

14. The system according to claim 6, wherein the intelligent expert systems are neural networks.

15. The system according to claim 7, wherein the graphics data format is an XML format.

16. The system according to claim 12, wherein the supply line network is selected from the group consisting of high-voltage networks, gas networks and water networks.

17. A document database for storing files selected from the group consisting of configuration data, process data elements and update data records, in a technical installation and its subunit, in a system for the operator control of subunits in the technical installation by editing graphical objects, the document data base comprising:
  a data editor;
  a graphics editor for monitoring and analyzing a user operator control command, said graphics editor starting a data editor when a user selects a graphical object;
  said data editor producing and/or updating configuration data for a represented subunit and the configuration data being associated with the graphical object selected, then said graphics editor visually displays the graphical object selected with an updated association between the updated configuration data and associated updated graphs, said data editor using the updated configuration data to control or reconfigure the technical installation or the subunits;
  a symbol database connected to and supplying graphical objects to said graphics editor, the graphical objects graphically representing the respective subunits in the technical installation; and
  a process data element updating and combining measured process data from the respective subunits for forming the updated graphs for the respective subunits.

18. A method for operator control of subunits in a technical installation by editing graphical objects, which comprises the steps of:
  providing a graphics editor;
  providing a symbol database from which it is possible to take graphical objects using the graphics editor, with the graphical objects graphically representing respective subunits in the technical installation;
  creating a process data element in which all measured process data in the technical installation are updated and are combined to form graphs for the respective subunits;
  monitoring and analyzing a user operator control command of the graphics editor by the graphics editor;
  starting a data editor when the user selects a graphical object, the data editor produces or updates configuration data for a represented subunit which are associated with the graphical object selected;
  using the graphics editor for logically combining the graphical object with an updated association for the updated configuration data and visually displays it with the associated updated graph; and
  the data editor using the updated configuration data to control or reconfigure the technical installation or the respective subunits.

19. A method for checking a selection of objects, where the objects respectively represent subunits in a technical installation and the subunits can be controlled and configured using configuration data, the selection of the objects producing or altering the configuration data associated with the represented subunit, which comprises the steps of:
  checking a consistency of selected objects in respect of already available objects using an association function;
    subsequently an admissible object selection in line with the association function prompts the configuration data associated with the represented subunit to be updated and the consistency of the updated configuration data for the selected subunit to be checked using admissible configurations of the technical installation; and
    an admissible selection in line with the association function prompts the process data elements associated with the represented subunit to be updated and the consistency of the then updated process data elements for the selected subunit to be checked using admissible operating states of the technical installation; and
  processing further the object selection, the updated configuration data and the updated process elements only if the object selection, the updated configuration data and the updated process elements are consistent.

20. The method according to claim 19, which further comprises providing an association table as the association function.

21. A computer program product for operator control of subunits in a technical installation by editing graphical objects, when stored in a computer memory and executed on a computer, the computer program product configuring the computer to comprise:
  a graphics editor, a user operator control command of said graphics editor being monitored and analyzed;
  a data editor being started when a user selects a graphical object, said data editor producing or updating configuration data for a represented subunit which are associated with a graphical object selected, said graphics editor then logically combining the graphical object with an updated association of the updated configuration data, and said data editor using the updated configuration data to control or reconfigure the technical installation or the respective subunits;
  a symbol database connected to said graphics editor and from which it is possible to take graphical objects using said graphics editor, the graphical objects graphically representing the respective subunits in the technical installation; and
  a process data element in which all measured process data for the technical installation are updated and are combined to form graphs for the respective subunits.

* * * * *